United States Patent
Garner et al.

(10) Patent No.: US 12,034,289 B1
(45) Date of Patent: Jul. 9, 2024

(54) CONDUIT SUPPORT SYSTEM AND ASSEMBLY

(71) Applicant: Resolve One, Inc., High Point, NC (US)

(72) Inventors: David Brian Garner, Winston Salem, NC (US); Michael Todd Woodlief, Oak Ridge, NC (US)

(73) Assignee: Resolve One, Inc., High Point, NC (US)

( * ) Notice: Subject to any disclaimer, the term of this patent is extended or adjusted under 35 U.S.C. 154(b) by 0 days.

(21) Appl. No.: 17/561,969

(22) Filed: Dec. 26, 2021

Related U.S. Application Data

(60) Provisional application No. 63/131,924, filed on Dec. 30, 2020.

(51) Int. Cl.
| | | |
|---|---|---|
| *H02G 3/00* | (2006.01) | |
| *H02G 3/04* | (2006.01) | |
| *H02G 3/36* | (2006.01) | |

(52) U.S. Cl.
CPC ........... *H02G 3/263* (2013.01); *H02G 3/0456* (2013.01); *H02G 3/36* (2013.01)

(58) Field of Classification Search
None
See application file for complete search history.

(56) References Cited

U.S. PATENT DOCUMENTS

| | | | | |
|---|---|---|---|---|
| 3,606,217 | A * | 9/1971 | Leiferman | E03C 1/042 248/57 |
| 5,615,850 | A * | 4/1997 | Cloninger | F16L 3/22 248/68.1 |
| 5,971,329 | A * | 10/1999 | Hickey | F16L 3/227 248/65 |
| 10,122,157 | B1 * | 11/2018 | Gintz | H02G 3/0437 |
| 10,644,486 | B2 * | 5/2020 | Gintz | H02G 3/0437 |
| 2009/0179116 | A1 * | 7/2009 | St-Louis | H04Q 1/06 248/68.1 |
| 2014/0332637 | A1 * | 11/2014 | Buttars | E04C 2/521 248/56 |
| 2022/0196185 | A1 * | 6/2022 | Guyatt | F16L 3/2235 |

* cited by examiner

*Primary Examiner* — Steven M Marsh
(74) *Attorney, Agent, or Firm* — MacCord Mason PLLC

(57) ABSTRACT

A universal conduit support receiver device and system. In one embodiment, a cable support to align a plurality of cables in a horizontal orientation or vertical orientation includes a pair of opposing retaining arms, a pair of raised platform neck, and a cable support chassis. The result is a hybrid pull-through receiver for enhancing the organizational and interchangeable routing of cables and wires.

15 Claims, 3 Drawing Sheets

CONDUIT SUPPORT SYSTEM AND ASSEMBLY

This application claims the benefit of provisional application No. 63/131,924, filed Dec. 30, 2020, which is incorporated herein by reference in its entirety.

FIELD

The present disclosure relates generally to electrical connection and, more particularly, to a universal pull-through receiver for enhancing the organizational and interchangeable routing of cables and wires.

BACKGROUND

Building systems often include electrical wiring, conduits, and the like to protect and route systems and electronics along a building, structure, or similar features. Therefore, Applicant desires a universal receiver for a cable management interconnect system, cable supports to align a plurality of cables, systems for organizing cables, and similar assemblies, without the drawbacks presented by conventional products.

BRIEF DESCRIPTION OF THE DRAWINGS

Embodiments of the disclosure will be better understood by a reading of the Description of Embodiments along with a review of the drawings, in which.

SUMMARY

Figure 1:
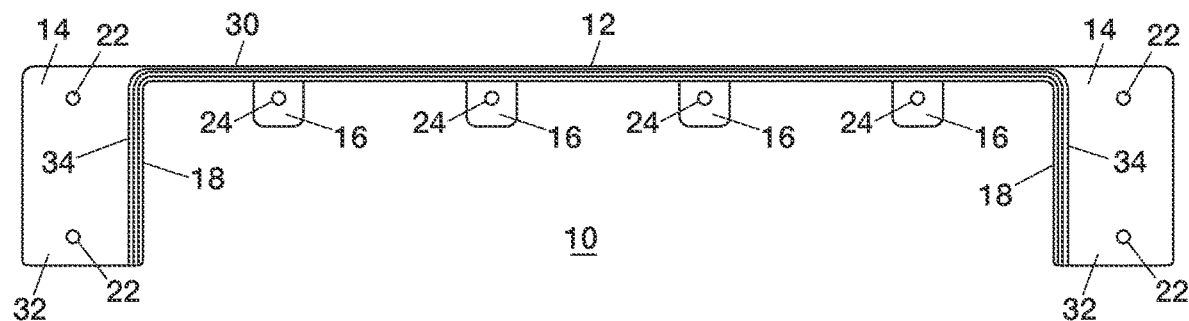
FIG. 1 is a top view of a universal receiver for a mass interconnect assembly according to one embodiment of the disclosure.
Figure 2:
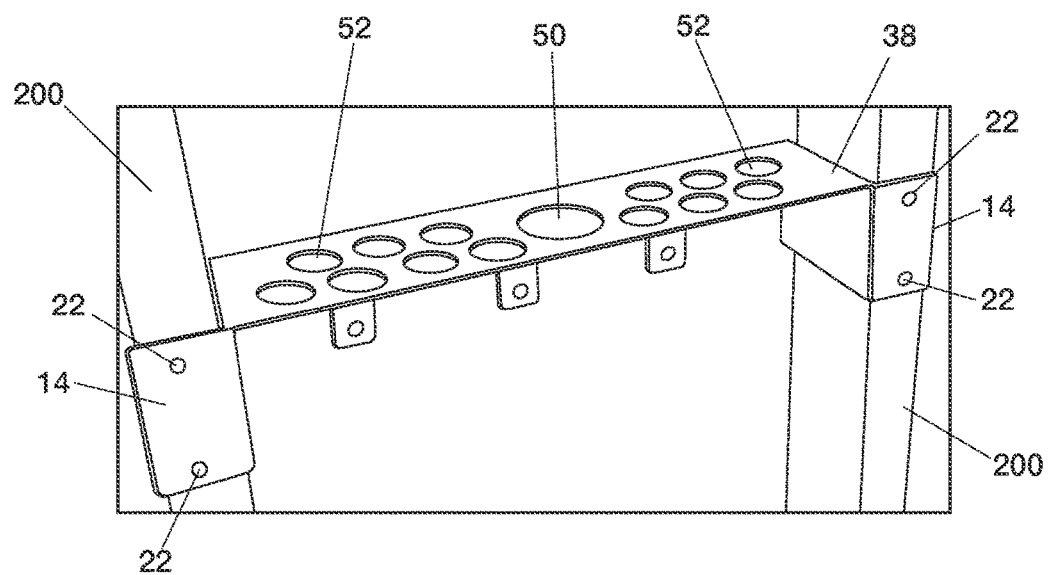
FIG. 2 is a front perspective view of the mass interconnect assembly embodiment of FIG. 1 in a vertical pull-through assembly.
Figure 3:
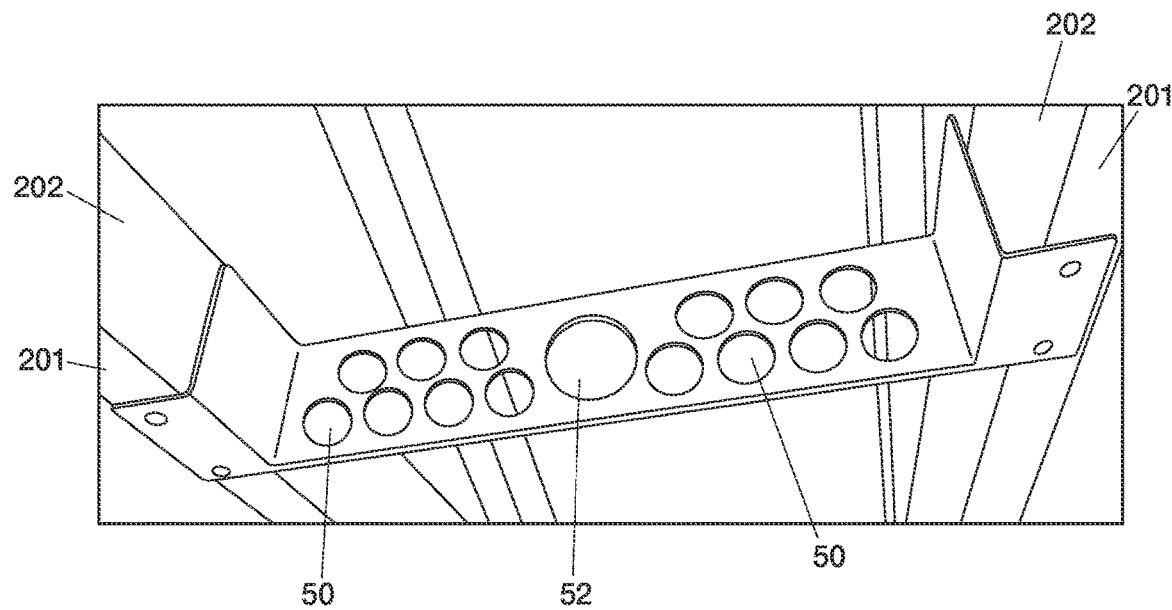
FIG. 3 is a front perspective view of the mass interconnect assembly embodiment of FIG. 1 in a horizontal pull-through assembly.
Figure 4:
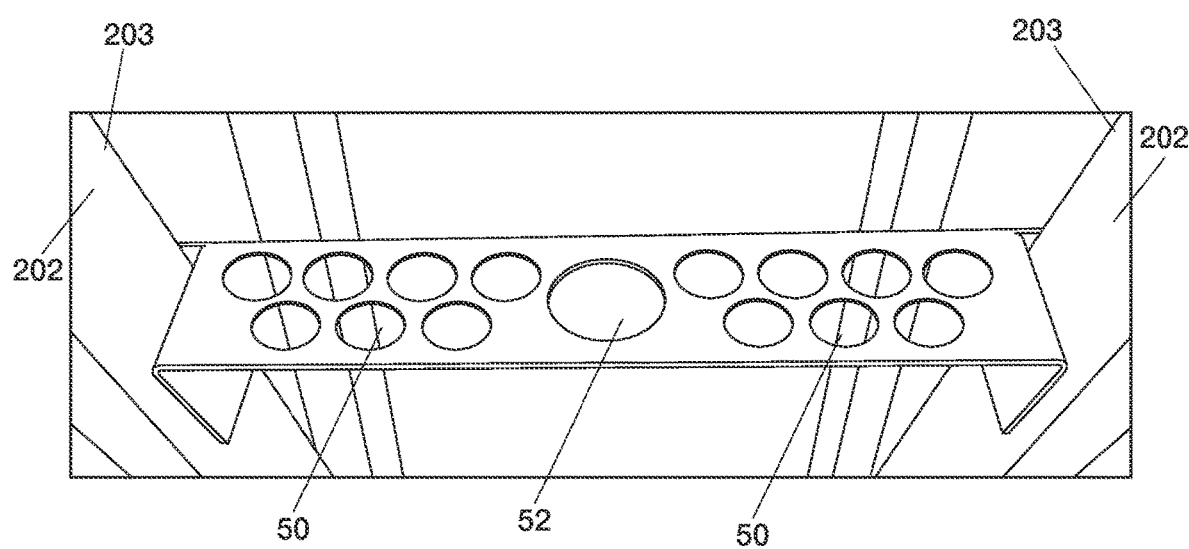
FIG. 4 is a front perspective view of the mass interconnect assembly embodiment of FIG. 1 in a horizontal pull-through assembly.
Figure 5:
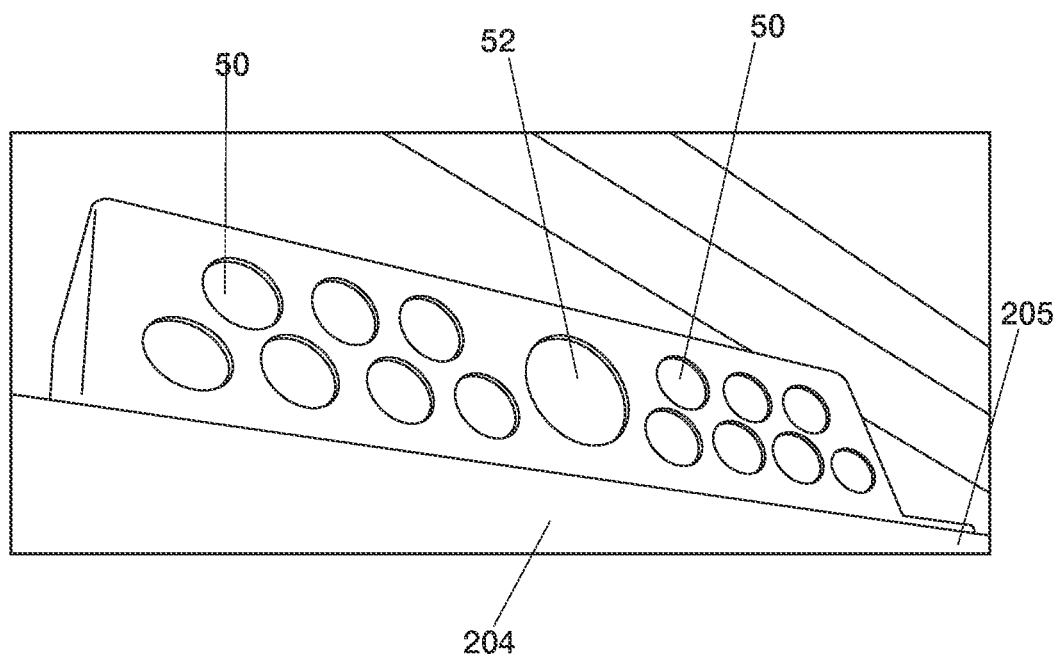
FIG. 5 is a front perspective view of the mass interconnect assembly embodiment of FIG. 1 in a horizontal pull-through assembly.
Figure 6:
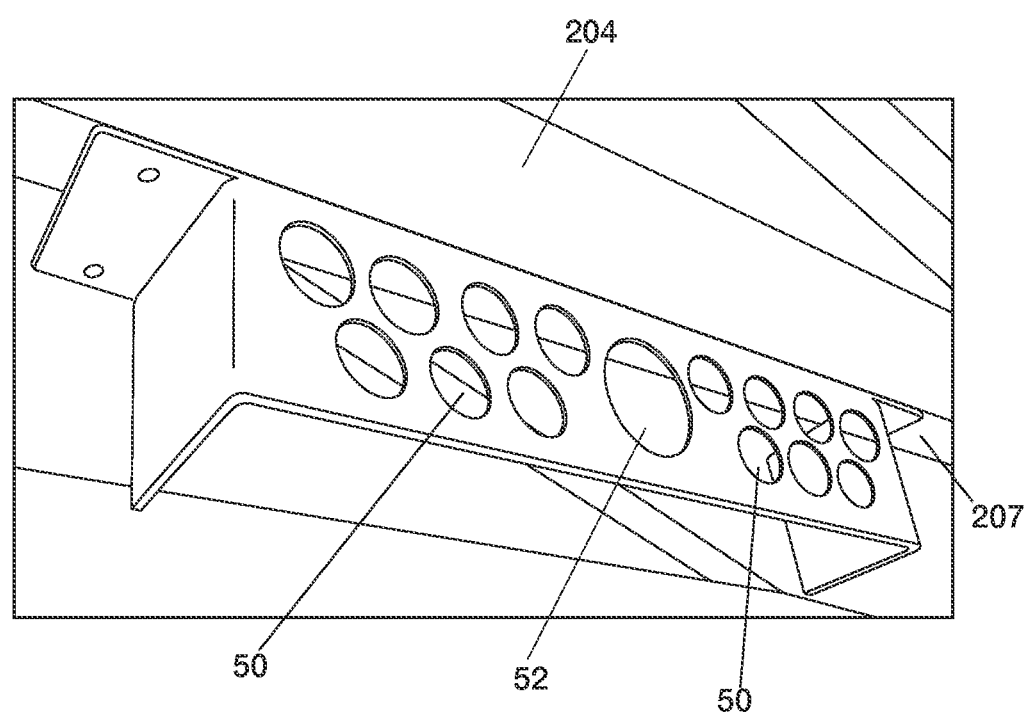
FIG. 6 is a front perspective view of the mass interconnect assembly embodiment of FIG. 1 in a horizontal pull-through assembly.

Applicant desires a conduit support universal receiver device, system, and mass interconnect method without the drawbacks presented by the traditional systems and methods.

In accordance with the present inventions, a universal conduit support receiver is provided for receiving and supporting a plurality of cable and wire combinations. These inventions provide an improved hybrid receiver that is convenient, efficient, and safe for the user, particularly when used in operating in both horizontal or vertical orientations.

In one embodiment, a cable support to align a plurality of cables, includes a pair of opposing retaining arms, wherein each retaining arm having an aperture to receive a fastener; a pair of raised platform necks extending from the corresponding retaining arms; and a cable support chassis substantially perpendicular about the raised platform necks.

In one example, the apparatus includes at least one recessed tab extension. The cable support chassis may include a plurality of cable alignment orifices. The cable alignment orifices may include a central orifice. The apparatus central orifice may include a diameter greater than a diameter of adjacent alignment orifices.

In certain examples, the central orifice may support about six 14-2 ROMEX cables. The apparatus central orifice may support about six 10-3 ROMEX cables. The central orifice may support about four 8-2 cables. The central orifice may support about four 6-2 ROMEX cables. The central orifice may support about two 8-3 ROMEX cables. The central orifice may support about two ⅔ ROMEX cables. The central orifice may support about six 14-2 armored cables or metal clad cables. The central orifice may support about six 10-2 armored cables or metal clad cables. The central orifice may support about two 10-3 armored cables or metal clad cables. The central orifice may support about two 6-4 armored cables or metal clad cables. The central orifice may support about one 4-3 armored cables or metal clad cable. The central orifice may support about one 2-4 armored cables or metal clad cable. The central orifice may support about two 8-8-8 service entrance cables. The central orifice may support about one 8-8-8-8 service entrance cable. The central orifice may support about one 4/0-4/0-2/0 service entrance cable. The central orifice may support central orifice adapted to support about twenty-four 7.6 millimeter low voltage cables.

In particular examples, the cable alignment orifices may include a plurality of alignment orifices. The plurality of alignment orifices may be positioned on opposite sides of a central orifice. The plurality of alignment orifices may include a smaller diameter than a diameter of a central orifice. The plurality of alignment orifices may include a generally circular shape. The plurality of alignment orifices may be positioned at equidistantly spaced locations from one another.

In certain examples, at least one of the plurality of alignment orifices support about three 14-2 ROMEX cables. The at least one of the plurality of alignment orifices may support about three 10-3 ROMEX cables. The at least one of the plurality of alignment orifices may support about two 8-2 cables. The at least one of the plurality of alignment orifices may support about two 6-2 ROMEX cables. The at least one of the plurality of alignment orifices may support about one 8-3 ROMEX cable. The at least one of the plurality of alignment orifices may support about one ⅔ ROMEX cable. The at least one of the plurality of alignment orifices may support about three 14-2 armored cables or metal clad cables. The at least one of the plurality of alignment orifices may support about three 10-2 armored cables or metal clad cables. The at least one of the plurality of alignment orifices may support about one 10-3 armored cable or metal clad cable. The at least one of the plurality of alignment orifices may support about one 2-3 armored cable or metal clad cable. The at least one of the plurality of alignment orifices may support about one 8-8-8 service entrance cables. The at least one of the plurality of alignment orifices may support about one 2-2-2-4 service entrance cable. The at least one of the plurality of alignment orifices may support about twelve 7.6 millimeter low voltage cables.

In particular examples, the cable support chassis includes a first, second, third and fourth sides, the first and second sides opposing one another and the third and fourth sides opposing one another. The retaining arms may mechanically engage a pair of opposing studs. The pair of opposing studs may be vertically spaced in a stud bay. The retaining arms may mechanically engage an upper face of a joist. The apparatus retaining arms may mechanically engage a lower face of a joist. The retaining arms may include a second aperture radially spaced from the first at least one aperture. The retaining arms may include a sunken mating face. The sunken mating face may include a substantially flat surface configured to interface with a support.

In particular examples, the apparatus may include an integral one-piece structure. The apparatus may include a substantially rigid material. The apparatus may route at least one cable in at least two directions. The at least two directions may include a vertical pull-though orientation with respect to a surface. The at least two directions may include a horizontal pull-though orientation with respect to a surface.

In one embodiment, a universal receiver for a cable management interconnect system includes a distal retaining arm and an opposing proximate retaining arm, wherein the distal retaining arm having at least one fastener aperture aligned parallel about at least one fastener aperture in the proximate retaining arm; a plurality of recessed tab extensions spaced between the distal retaining arm and the proximate retaining arm, and wherein the recessed tab extensions having a fastener aperture aligned parallel with the fastener apertures in the distal retaining arm and the proximate retaining arm; and a cable support chassis substantially perpendicular about the distal retaining arm, proximate retaining arm, and recessed tab extensions.

In particular examples, the cable support chassis may include a plurality of cable alignment orifices. The cable alignment orifices may include a central orifice. The central orifice may include a diameter greater than a diameter of adjacent alignment orifices.

In certain examples, at least one of the plurality of alignment orifices support about three 14-2 ROMEX cables. The at least one of the plurality of alignment orifices may support about three 10-3 ROMEX cables. The at least one of the plurality of alignment orifices may support about two 8-2 cables. The at least one of the plurality of alignment orifices may support about two 6-2 ROMEX cables. The at least one of the plurality of alignment orifices may support about one 8-3 ROMEX cable. The at least one of the plurality of alignment orifices may support about one ⅔ ROMEX cable. The at least one of the plurality of alignment orifices may support about three 14-2 armored cables or metal clad cables. The at least one of the plurality of alignment orifices may support about three 10-2 armored cables or metal clad cables. The at least one of the plurality of alignment orifices may support about one 10-3 armored cable or metal clad cable. The at least one of the plurality of alignment orifices may support about one 2-3 armored cable or metal clad cable. The at least one of the plurality of alignment orifices may support about one 8-8-8 service entrance cables. The at least one of the plurality of alignment orifices may support about one 2-2-2-4 service entrance cable. The at least one of the plurality of alignment orifices may support about twelve 7.6 millimeter low voltage cables.

In particular examples, the cable alignment orifices may include a plurality of alignment orifices. The plurality of alignment orifices may be positioned on opposite sides of a central orifice. The plurality of alignment orifices may include a smaller diameter than a diameter of a central orifice. The plurality of alignment orifices may include a generally circular shape. The plurality of alignment orifices may be positioned at equidistantly spaced locations from one another.

In certain examples, at least one of the plurality of alignment orifices support about three 14-2 ROMEX cables. The at least one of the plurality of alignment orifices may support about three 10-3 ROMEX cables. The at least one of the plurality of alignment orifices may support about two 8-2 cables. The at least one of the plurality of alignment orifices may support about two 6-2 ROMEX cables. The at least one of the plurality of alignment orifices may support about one 8-3 ROMEX cable. The at least one of the plurality of alignment orifices may support about one ⅔ ROMEX cable. The at least one of the plurality of alignment orifices may support about three 14-2 armored cables or metal clad cables. The at least one of the plurality of alignment orifices may support about three 10-2 armored cables or metal clad cables. The at least one of the plurality of alignment orifices may support about one 10-3 armored cable or metal clad cable. The at least one of the plurality of alignment orifices may support about one 2-3 armored cable or metal clad cable. The at least one of the plurality of alignment orifices may support about one 8-8-8 service entrance cables. The at least one of the plurality of alignment orifices may support about one 2-2-2-4 service entrance cable. The at least one of the plurality of alignment orifices may support about twelve 7.6 millimeter low voltage cables.

In particular examples, the cable support chassis may include a first, second, third and fourth sides, the first and second sides opposing one another and the third and fourth sides opposing one another. The distal retaining arm and the proximate retaining arm may mechanically engage a pair of opposing studs. The pair of opposing studs may be vertically spaced in a stud bay. The distal retaining arm and the proximate retaining arm may mechanically engage an upper face of a joist. The distal retaining arm and the proximate retaining arm may mechanically engage a lower face of a joist. The distal retaining arm may include a second aperture radially spaced from the first at least one aperture. The proximate retaining arm may include a second aperture radially spaced from the first at least one aperture.

In certain examples, the distal retaining arm may include a sunken mating face. The sunken mating face may include a substantially flat surface configured to interface with a support. The pair of raised platform necks may extend from the corresponding proximate retaining arm and distal retaining arm. The apparatus may include an integral one-piece structure. The apparatus may include a substantially rigid material. The plurality of recessed tab extensions may extend perpendicular from a horizontal plane. The plurality of recessed tab extensions may be spaced offset from a horizontal plane. The plurality of recessed tab may extension comprising a column of tab members. The plurality of recessed tab extensions may mechanically engage an upper face of a truss.

The plurality of recessed tab extensions may mechanically engage a lower face of a truss. The at least one of the apertures may mount a transit path of at least one cable about a support frame. The apparatus may route at least one cable in at least two directions. The at least two directions may include a vertical pull-through orientation with respect to a surface. The at least two directions may include a horizontal pull-through orientation with respect to a surface.

In one embodiment, a system for organizing cables includes at least one cable; and a universal interconnect frame having an assembly adjacent to a horizontal platform assembly for routing the at least one cable in at least two directions in either a horizontal orientation and a vertical orientation relative to a support.

In particular examples, the universal interconnect frame may include a distal retaining arm and an opposing proximate retaining arm. The distal retaining arm and the proximate retaining arm may mechanically engage a pair of opposing studs. The distal retaining arm and the proximate retaining arm may mechanically engage an upper face of a joist. The distal retaining arm and the proximate retaining arm may mechanically engage a lower face of a joist.

In certain examples, the universal interconnect frame may include pair of raised platform necks extending from a corresponding proximate retaining arm and distal retaining arm. The universal interconnect frame may include at least one recessed tab extension. The universal interconnect frame may include a cable support chassis. The cable support chassis may include a plurality of cable alignment orifices. The cable alignment orifices may include a central orifice. The system may include fasteners protruding through the universal interconnect frame.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

DETAILED DESCRIPTION

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing embodiments of the disclosure and are not intended to limit the disclosure or any inventions thereto. As best seen in FIG. 1, the universal receiver 12 provides cable, wire, and the like management interconnection. As shown in the Figures, the receiver device may include a distal retaining arm 14 and an opposing proximate retaining arm 14', wherein the distal retaining arm 14 having at least one fastener aperture 22 that is aligned parallel, or the like, about at least one fastener aperture 22 in the proximate retaining arm 14'; a plurality of recessed tab extensions 16 spaced between the distal retaining arm 14 and the proximate retaining arm 14', and wherein the recessed tab extensions 16 having a fastener aperture 24 aligned parallel, or the like, with the fastener apertures 22 in the respective distal and proximate retaining arms; and a cable support chassis 12 substantially perpendicular about the distal retaining arm 14, proximate retaining arm 14', and recessed tab extensions 16.

In particular examples, the cable support chassis 12 may include a plurality of cable alignment orifices. The cable alignment orifices may include a central orifice 50. The central orifice 50 may include a diameter greater than a diameter of adjacent alignment orifices 52.

In one embodiment, a cable support include a plurality of cables, and a pair of opposing retaining arms 14,14', wherein each retaining arm 14 having an aperture 22 adapted to receive a fastener; a pair of raised platform necks 18 extending from the corresponding retaining arms; and a cable support chassis 12 substantially perpendicular about the raised platform necks 18. Those of ordinary skill in the art having the benefit of this disclosure will recognize additional alignments, orientations, and features herein.

In certain examples, the distal retaining arm 14 may include a sunken mating face 36. The sunken mating face 36 may include a substantially flat surface configured to interface with a support arm.

In one embodiment, a cable support adapted to align a plurality of cables, includes a pair of opposing retaining arms 14, 14', wherein each retaining arm 14, 14' includes an aperture 22 to receive a fastener; a pair of raised platform necks 18 that generally extend from the corresponding retaining arms 14, 14'. In certain examples, the cable support includes a cable support chassis 12 that is generally perpendicular about the raised platform necks 18. Those of ordinary skill in the art having the benefit of this disclosure will recognize additional alignments, orientations, and features herein.

In one embodiment, a universal receiver for a cable management interconnect system includes a distal retaining arm 14 and an opposing proximate retaining arm 14'. As shown and described herein, the distal retaining arm 14 has at least one fastener aperture 22 that is generally aligned parallel about at least one fastener aperture 22 in the proximate retaining arm 14'. As illustrated herein, a plurality of recessed tab extensions 16 may be generally spaced between the distal retaining arm 14 and the proximate retaining arm 14'. The recessed tab extensions 16 may have a fastener aperture 24 generally aligned parallel with the fastener apertures in the distal retaining arm 14 and the proximate retaining arm 15'. The cable support chassis may be aligned substantially perpendicular about the distal retaining arm 14, proximate retaining arm 14', and the recessed tab extensions 16. Those of ordinary skill in the art having the benefit of this disclosure will recognize additional alignments, orientations, and features herein.

In certain embodiments, a central orifice may support any variety of cabling, including, but not limited to, six 14-2 ROMEX cables, six 10-3 ROMEX cables, six 10-3 ROMEX cables, four 8-2 cables, four 6-2 ROMEX cables, two 8-3 ROMEX cables, two ⅔ ROMEX cables, six 14-2 armored cables or metal clad cables, six 10-2 armored cables or metal clad cable, two 10-3 armored cables or metal clad cables, two 6-4 armored cables or metal clad cables, one 4-3 armored cables or metal clad cable, one 2-4 armored cables or metal clad cable, two 8-8-8 service entrance cables, one 4/0-4/0-2/0 service entrance cable, and twenty-four 7.6 millimeter low voltage cables, and the like.

In certain embodiments, a plurality of alignment orifices support any variety of cabling, including, but not limited to, three 14-2 ROMEX cables, three 10-3 ROMEX cables, two 8-2 cables, two 6-2 ROMEX cables, one 8-3 ROMEX cable, one ⅔ ROMEX cable, three 14-2 armored cables or metal clad cables, three 10-2 armored cables or metal clad cables, one 10-3 armored cable or metal clad cable, one 2-3 armored cable or metal clad cable, one 8-8-8 service entrance cables, one 2-2-2-4 service entrance cable, twelve 7.6 millimeter low voltage cables, and the like.

In other embodiments, the disclosure includes a mass interconnect kit. In such an embodiment, the kit may comprise a receiver, e.g. any of the receiver elements and components previously shown or described. Further, other embodiments of the kit may comprise cabling, e.g. any combination of wiring, cabling, and the like elements and components previously shown or described. Those of ordinary skill in the art having the benefit of this disclosure will recognize additional kit element alignments, orientations, and features herein.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

What is claimed is:

1. A system for organizing cables comprising:
   a. at least one cable; and
   b. at least one universal interconnect frame having
      i. a cable support assembly aligned substantially perpendicularly adjacent to a horizontal securement platform assembly for routing said at least one cable in at least two directions in either a horizontal orientation and an independent vertical orientation being substantially ninety degrees from said horizontal orientation relative to a corresponding pair of vertical supports and horizontal supports;
      ii. a distal retaining arm and an opposing proximate retaining arm;
      iii. a pair of raised platform necks extending substantially ninety degrees from a corresponding proximate retaining arm and distal retaining arm; and
      iv. at least one recessed tab extension having a fastener aperture and spaced between said distal retaining arm and said opposing proximate retaining arm.

2. The system of claim 1, wherein said cable support having a plurality of cable alignment orifices.

3. A universal receiver for a cable management interconnect system, said universal receiver comprising:
   a. a distal retaining arm and an opposing proximate retaining arm, wherein said distal retaining arm having at least one fastener aperture aligned parallel about at least one fastener aperture in said proximate retaining arm, and including a pair of raised platform necks extending substantially ninety degrees from said corresponding proximate retaining arm and said distal retaining arm;
   b. a plurality of recessed tab extensions spaced between said distal retaining arm and said proximate retaining arm, and wherein said recessed tab extensions having a fastener aperture aligned parallel with said fastener apertures in said distal retaining arm and said proximate retaining arm; and
   c. a cable support substantially perpendicular about said pair of raised platform necks, said distal retaining arm, proximate retaining arm, and recessed tab extensions, and
      wherein said cable support having a first, second, third and fourth sides, said first and second sides opposing one another and said third and fourth sides opposing one another, and
      wherein said apparatus consisting essentially of an integral one-piece structure operating in a first horizontal orientation about said proximate retaining arm and said distal retaining arm and an independent vertical orientation about said proximate retaining arm and said distal retaining arm in an alignment ninety degrees from said first horizontal orientation.

4. The apparatus of claim 3, wherein said cable support having a plurality of cable alignment orifices, including a central orifice with a diameter greater than a diameter of adjacent alignment orifices.

5. The apparatus of claim 4, wherein said central orifice adapted to support a cable selection chosen from the group consisting of about six 14-2 ROMEX cables, six 10-3 ROMEX cables, six 10-3 ROMEX cables, four 8-2 cables, four 6-2 ROMEX cables, two 8-3 ROMEX cables, two ⅔ ROMEX cables, six 14-2 armored cables or metal clad cables, six 10-2 armored cables or metal clad cable, two 10-3 armored cables or metal clad cables, two 6-4 armored cables or metal clad cables, one 4-3 armored cables or metal clad cable, one 2-4 armored cables or metal clad cable, two 8-8-8 service entrance cables, one 4/0-4/0-2/0 service entrance cable, and twenty-four 7.6 millimeter low voltage cables.

6. The apparatus of claim 4, wherein said cable alignment orifices comprising a plurality of alignment orifices positioned on opposite sides of a central orifice.

7. The apparatus of claim 6, wherein said plurality of alignment orifices having a smaller diameter than a diameter of a central orifice.

8. The apparatus of claim 6, wherein said plurality of alignment orifices being positioned at equidistantly spaced locations from one another.

9. The apparatus of claim 8, wherein at least one of said plurality of alignment orifices adapted to support a cable selection chosen from the group consisting of about three 14-2 ROMEX cables, three 10-3 ROMEX cables, two 8-2 cables, two 6-2 ROMEX cables, one 8-3 ROMEX cable, one ⅔ ROMEX cable, three 14-2 armored cables or metal clad cables, three 10-2 armored cables or metal clad cables, one 10-3 armored cable or metal clad cable, one 2-3 armored cable or metal clad cable, one 8-8-8 service entrance cables, one 2-2-2-4 service entrance cable, twelve 7.6 millimeter low voltage cables.

10. The apparatus of claim 3, wherein said distal retaining arm and said proximate retaining arm adapted to mechanically engage a pair of opposing studs.

11. The apparatus of claim 3, wherein said distal retaining arm and said proximate retaining arm adapted to mechanically engage an upper face of a joist.

12. The apparatus of claim 3, wherein said distal retaining arm and said proximate retaining arm adapted to mechanically engage a lower face of a joist.

13. The apparatus of claim 3, wherein said distal retaining arm having a sunken mating face with a substantially flat surface configured to interface with a support.

14. The apparatus of claim 3, wherein
   a. said plurality of recessed tab extensions extend perpendicular from a horizontal plane; and
   b. said plurality of recessed tab extensions being spaced offset from a horizontal plane.

15. The apparatus of claim 3, wherein said plurality of recessed tab extensions comprising a column of tab members.

* * * * *